United States Patent [19]

Kagawa et al.

[11] Patent Number: 5,418,618
[45] Date of Patent: May 23, 1995

[54] TONE PROCESSING METHOD FOR FORMING A HALFTONE IMAGE

[75] Inventors: Tetsuya Kagawa, Osaka; Katsumi Nagata, Sakai, both of Japan

[73] Assignee: Mita Industrial Co., Ltd., Japan

[21] Appl. No.: 848,281

[22] Filed: Mar. 9, 1992

[51] Int. Cl.$^6$ .................. H04N 1/21; H04N 1/40
[52] U.S. Cl. .................. 358/298; 358/300; 358/457; 358/462
[58] Field of Search .............. 358/296, 298, 300, 455, 358/456, 457, 462, 536; 382/50; 346/108, 160

[56] References Cited

U.S. PATENT DOCUMENTS

| | | | |
|---|---|---|---|
| 4,491,875 | 1/1985 | Kawamura | 358/298 |
| 4,553,173 | 11/1985 | Kawamura | 358/298 X |
| 4,706,077 | 11/1987 | Roberts et al. | 358/455 |
| 4,933,777 | 6/1990 | Hsieh et al. | 358/456 |
| 5,077,615 | 12/1991 | Tsuji | 358/298 |
| 5,148,287 | 9/1992 | Kemmochi et al. | 358/298 |
| 5,177,795 | 1/1993 | Tanioka et al. | 382/50 |
| 5,204,753 | 4/1993 | Tai | 358/298 |

*Primary Examiner*—Benjamin R. Fuller
*Assistant Examiner*—Eric Frahm
*Attorney, Agent, or Firm*—Beveridge, DeGrandi, Weilacher & Young

[57] ABSTRACT

In case of a color original where both graphics and text are present, tone processing is executed by combining a multi-value dither matrix control using a 2×2 dot dispersion threshold matrix where 64 non-consecutive threshold values are assigned to each dot of the 2×2 matrix. Dots are darkened accordingly if an input value is equal to or greater than a threshold value for a particular quadrant of the 2×2 matrix.

12 Claims, 7 Drawing Sheets

Fig.1

| 1 | 3 | 5 | ... | 127 | 129 | 131 | 133 | ... | 255 |
|---|---|---|-----|-----|-----|-----|-----|-----|-----|
| 130 | 132 | 134 | ... | 256 | 2 | 4 | 6 | ... | 128 |

Fig. 2

| 1 | 3 |
|---|---|
| 4 | 2 |

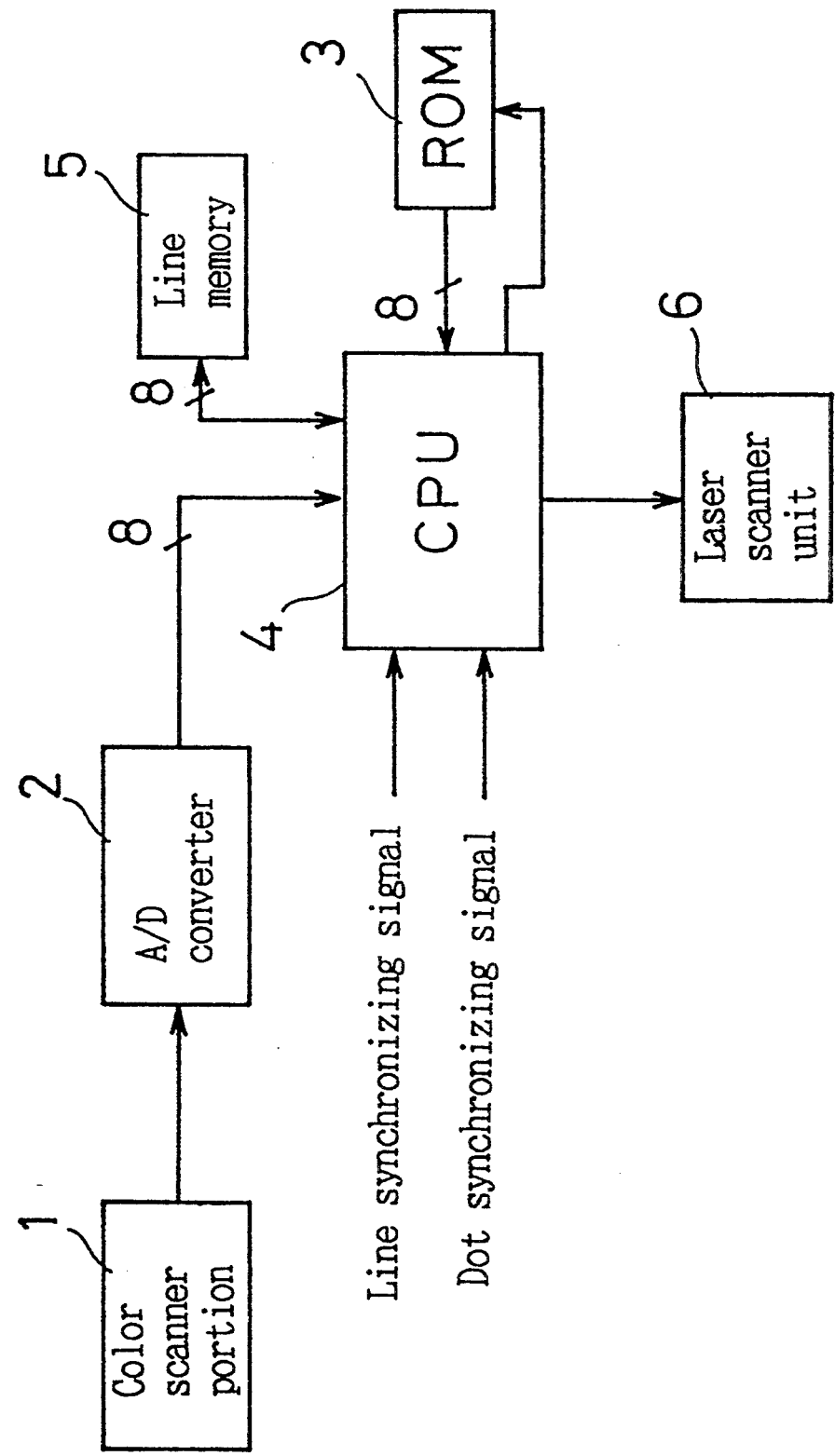

TONE PROCESSING METHOD FOR FORMING A HALFTONE IMAGE

BACKGROUND OF THE INVENTION

1. Field of the Invention

The present invention relates to a tone processing method suitable for use in an image forming apparatus such as an electrophotographic copying machine and a printer.

2. Description of the Prior Art

Conventionally, in a digital color electrophotographic copying machine which functions as an image forming apparatus, in order to improve tone reproduction thereof, a halftone color image has been formed by executing a tone processing by combining a multi-value dither matrix control using a threshold matrix with a pulse width modulation for dividing one dot of image into plural values by varying a pulse width for controlling the ON and OFF of a laser beam output used as a light source. As the threshold matrix used for the multi-value dither matrix control, a dot concentration threshold matrix has been used by which excellent tone is obtained when a color original is a picture. With a dot dispersion threshold matrix, tone deteriorates although resolution improves.

According to the conventional tone processing method, however, when a color original where letters are present together with a picture is tone-processed by use of the dot concentration matrix, the letters cannot be excellently reproduced due to inferior resolution thereof although an image of the picture is excellently reproduced. For this reason, for a color original where both a picture and letters are present, a method has been considered in which the original is sectioned into picture areas and letter areas so that a suitable tone processing is executed for each area. By this method, however, a processing circuit of complicated arrangement is required, and since the area sectioning is difficult, there is a possibility that image quality obtained is poor due to errors in the area sectioning.

SUMMARY OF THE INVENTION

An object of the present invention is to provide tone processing method by which images of both a picture and letters present in color original are excellently reproduced so that an excellent halftone color image is obtained.

According to the present invention, in a tone processing method where the ON and OFF of a laser beam scanned in order to form an image on an image forming medium is controlled by a pulse-width-modulated pulse and where a halftone image is formed by executing tone processing by combining multi-value dither matrix control using a threshold matrix with the pulse width modulation, a 2×2 dot dispersion threshold matrix is used for the multi-value dither matrix control when a halftone image having both a picture and letters are present is formed. In the threshold matrix, a plurality of threshold values are alternately disposed in the order of value first to one pair of two opposing matrix dot pairs and then alternately disposed to the other opposing matrix dot pair.

BRIEF DESCRIPTION OF THE DRAWINGS

This and other objects and features of this invention will become clear from the following description taken in conjunction with the preferred embodiments with reference to the accompanied drawings in which:

FIG. 1 shows a dot dispersion matrix employed for a method of the present invention;

FIG. 2 shows a matrix order of the dot dispersion matrix of FIG. 1;

FIG. 3A is a block diagram of a tone processing circuit employed for the method of the present invention;

DESCRIPTION OF THE PREFERRED EMBODIMENTS

Figure 3B:
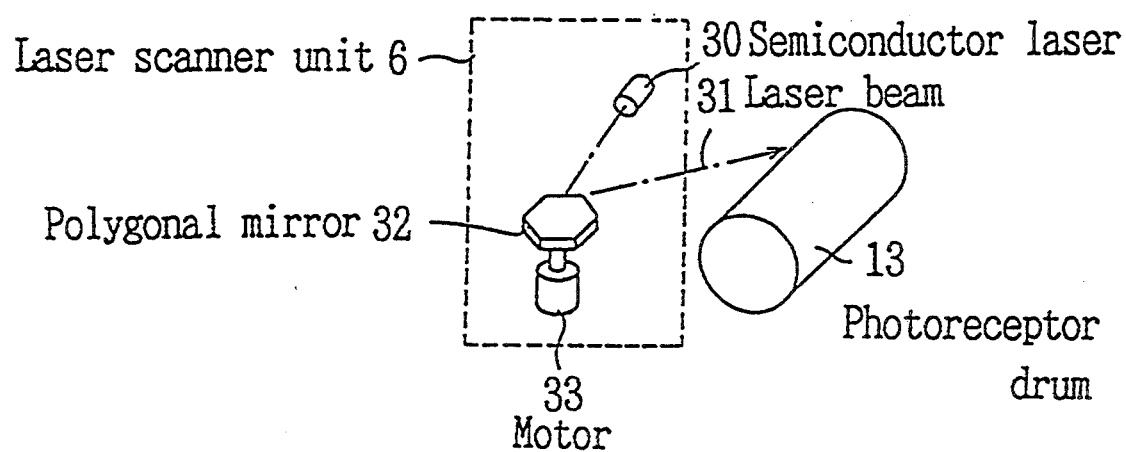
FIG. 3B is a view showing an arrangement of a laser scanner unit of FIG. 3A.

An embodiment of the present invention will hereinafter be described as applied to a digital electrophotographic copying machine with reference to the drawings.

Figure 2:
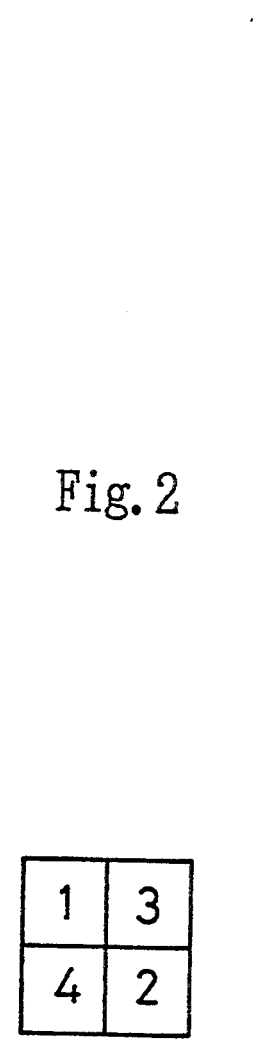

In this embodiment, when a color original includes both a picture and letters, an excellent halftone color image is formed by executing tone processing by combining a multi-value dither matrix control using a 2×2 dot dispersion threshold matrix where 64 threshold values are provided to one dot of image as shown in FIG. 1 with a pulse width modulation for dividing one dot of image into 64 values by varying a pulse width for controlling the ON and OFF of a laser beam output. More specifically, in the 2×2 dot dispersion threshold matrix, 256 tone threshold values are alternately disposed in the matrix order shown in FIG. 2. The tone threshold value in the first and second order for the first pair of two opposing matrix dots (matrix order positions 1 and 2) has 64 possible threshold values for each of the two matrix dots. The tone threshold values are alternately disposed in the order of value to the other opposing matrix dot pair (matrix orders 3 and 4), and 64 threshold values are provided to each of these two matrix dots as well. The matrix dot of the matrix order 1 is provided with threshold values of odd tone between 1 and 128, the matrix dot of the matrix order 2 is provided with threshold values of even tone between 1 and 128, the matrix dot of the matrix order is provided with threshold values of odd tone between 129 and 256, and the matrix dot of the matrix order 4 is provided with threshold values of even tone between 129 and 256.

FIG. 3A shows a circuit block (in this case, only a color image data system for yellow is shown) for executing a tone processing by combining the multi-value dither matrix control using the above-described 2×2 dot dispersion threshold matrix. In the figure, the numeral 1 is a color scanner portion for obtaining color image data of three colors of red (R), green (G) and blue (B) by reading a color original to be copied. The numeral 2 is an analog/digital converter for converting color image data (R, G, B) of three colors which are of the configuration of three primary colors of light obtained from the color scanner portion 1 into 8-bit (256-tone) color image data (digital data). The numeral 3 is a read only memory (ROM) where threshold values of the 2×2 dot dispersion threshold matrix as shown in FIG. 1 are stored in a look-up table. The numeral 4 is a tone processing microcomputer (hereinafter referred to as CPU). The color image data from the analog/digital converter 2 are temporarily converted by a color correction processing portion (not shown) into color image data of three colors of yellow, magenta and cyan representing toner density (in some occasions, black is added to the three colors), and the converted data are input into the CPU 4. In this case, after one line of the inputted yellow data is temporarily stored in a line memory 5 (e.g. a first in first out (FIFO) memory) in response to a line synchronizing signal, the CPU 4 sequentially reads-in the color image data from the line memory 5 and compares them with the threshold values stored in the ROM 3 until the next line is stored, and the CPU 4 outputs in response to a dot synchronizing signal a 64-value (65-tone) pulse width modulation signal (hereinafter referred to as PWM signal) which is in accordance with the result of the above comparison. The numeral 6 is a laser scanner unit for outputting a laser beam in response to the PWM signal from the CPU 4. By the laser beam output from the laser scanner unit 6, a latent image based on the color image data of yellow is formed on a photoreceptor drum. The laser scanner unit 6 comprises, as shown in FIG. 3B, a semiconductor laser 30 activated in response to the PWM signal outputted by the CPU4, a polygonal mirror 32 for causing a laser beam 31 irradiated by the semiconductor laser device 30 to scan the surface of a photoreceptor drum 13, and a motor 33 for rotating the polygonal mirror 32.

Figure 4:
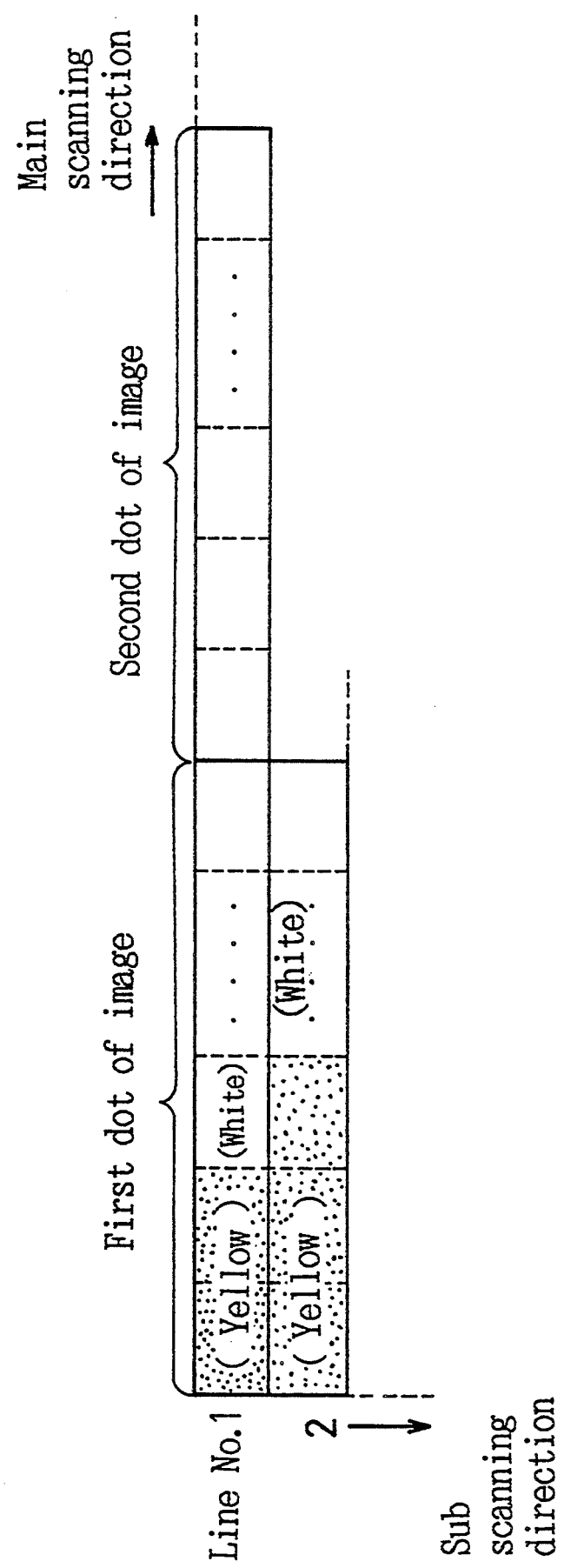
FIG. 4 is a view for explaining an image formation when a laser beam is outputted by the tone processing method of the present invention.
Figure 5:
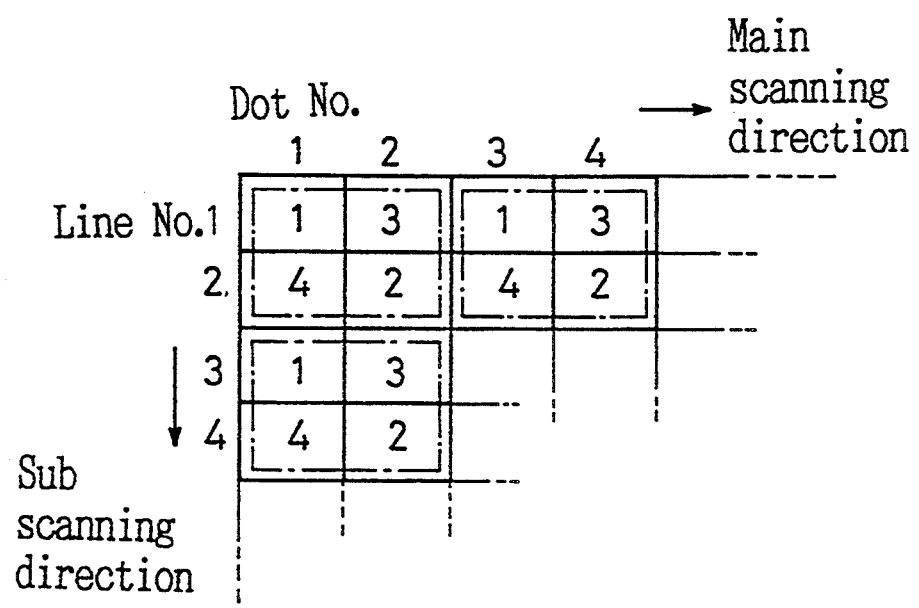
FIG. 5 shows an arrangement of the dot dispersion matrix in forming an image by the tone processing method of the present invention.

For example as illustrated in FIG. 4, the data value of an 8-bit color image data of yellow corresponding to a first dot of image on a first scanning line is three-tone, the CPU 4 compares the data with threshold values provided to a matrix dot of the matrix order 1 corresponding to the first dot. If a conforming threshold value is present in this case, the laser scanner unit 6 is supplied with a PWM signal indicating that yellow toner is provided only to two of the sections of the first dot in correspondence with the number of threshold values lower than the conforming threshold value (two of three-and one-tones) (see FIG. 4). When the data value of an 8-bit color image data of yellow corresponding to a second dot of image on the first scanning line is 63-tone, the CPU 4 compares the data with threshold values provided to a matrix dot of the matrix order 3 corresponding to the second dot. Since no conforming threshold value is present in this case, the laser scanner unit 6 is supplied with a PWM signal indicating that no yellow toner is provided to the entire area of the second dot as shown in FIG. 4 (i.e. the laser beam output is OFF). After the processing of the first scanning line is completed, when the data value of an 8-bit color image data of yellow corresponding to a first dot of image of a second scanning line is 134-tone, the CPU 4 compares the data with threshold values provided to a matrix dot of the matrix order 4 corresponding to the first dot. Since a conforming threshold value is present in this case, the laser scanner unit 6 is supplied with a PWM signal indicating that yellow toner is provided to only three of the sections of the first dot in correspondence with the number of threshold values lower than the conforming threshold value (three of 134-, 132- and 130-tones) (see FIG. 4). Thereafter, similar processings is executed by comparing the data with the 2×2 dot dispersion threshold matrix as shown in FIG. 5.

In this example, although only a tone processing of the color image data of yellow has been described in the above for convenience, a similar tone processing is executed with respect to the color image data of magenta, cyan and black, respectively.

Figure 6:
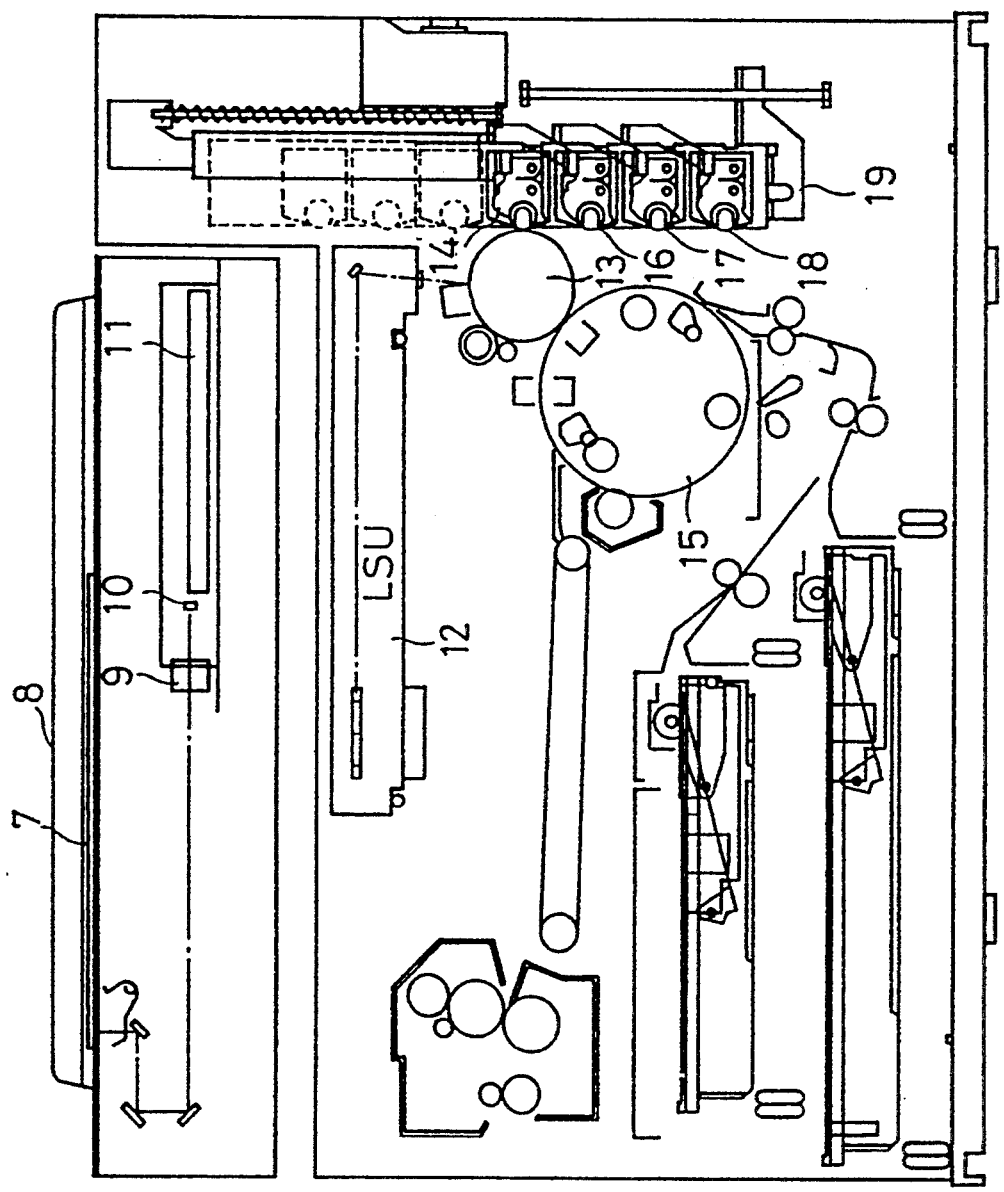
FIG. 6 is a schematic view of a digital color electrophotographic copying machine embodying the method of the present invention.

FIG. 6 is a schematic view of a digital color electrophotographic copying machine provided with a circuit block for executing the above-described tone processing. A color original (including both a picture and letters) placed on a contact glass 7 so as to be pressed down by an original cover 8 is scanned by a scanning optical system of the color scanner portion. Image information thereof is directed through light serving as an information carrying medium from a condenser lens 9 to a light receiving device such as a charge coupled device (CCD). After converted into an electric signal, it is signal-processed by an image processing circuit including the tone processing circuit block. Thereafter, it is formed into a latent image on the photoreceptor drum 13 by a laser scanner unit 12. Prior to this, the surface of the photoreceptor drum 13 is charged by a main charger.

In a case where a color image is formed, first, a latent image is formed on the photoreceptor drum 13 by a laser beam output in response to the PWM signal obtained by signal-processing the color image data of yellow. The latent image is developed by a Y developer unit 14. The Y developer unit 14 contains yellow toner, and develops the latent image on the photoreceptor drum 13 with the yellow toner. Then, the image on the photoreceptor drum 13 developed with the yellow toner is transferred onto a sheet of paper arranged to wind around the surface of a transferring drum 15.

Then, the sheet is left attached onto the surface of the transferring drum 15 so that an image of a next color is transferred thereon. That is, after a cleaning of residual toner by a cleaning portion and a discharging by a discharger (not shown), the photoreceptor drum 13 is again charged by the main charger. In this process, a latent image corresponding to a magenta image on the photoreceptor drum 13 formed by a laser beam output for forming a latent image in response to a PWM signal obtained by signal-processing the color image data of magenta is developed by an M developer unit 16. At this time, the M developer unit 16 is brought to a development position opposite to the photoreceptor drum 13 in place of the Y developer unit 14, and develops the latent image with magenta toner.

In this embodiment, as developer units, the Y developer unit 14 for development of yellow images, the M developer unit 16 for development of magenta images, a C developer unit 17 for development of cyan image and a BK developer unit 18 for development of black are successively attached as shown in FIG. 6 in a vertical direction on a moving body 19 which moves in vertical directions. The developer units 14, 16, 17 and 18 are alternatively brought to a development position (the position opposite to the photoreceptor drum 13) according to the color image data for forming a latent image by a laser output.

The image on the photoreceptor drum 13 developed with the magenta toner is transferred onto the sheet on the transferring drum 15 (the sheet where the yellow image has been transferred). Cyan and black images are transferred onto the sheet in a similar manner to form a color image. Thereafter, the sheet where the color image is formed is separated from the transferring drum 15 and fixed by a fuser to be discharged from the electrophotographic copying machine.

Although only a case in which a color original where both a picture and letters are present is copied was described in this embodiment, in a case where a color original where only a picture is present is copied, the pulse width modulation for dividing one dot of image into 64 values is combined with a multi-value dither matrix control using a 2×2 dot concentration threshold matrix having a result of excellent resolution. Because of this, threshold values of both threshold matrices are stored in the ROM, and the threshold values of one of the threshold matrices is selected according to a mode change-over (between a picture and letter mode and a picture mode) in the electrophotographic copying machine.

In the above-described embodiment, since a tone processing is executed by combining the multi-value dither matrix control using the 2×2 dot dispersion threshold matrix where 64 threshold values are provided to one dot of image with the pulse width modulation for dividing one dot of image into 64 values, 257 tones are available. Moreover, since deterioration of tone by the dot dispersion matrix is restrained by a way of the threshold matrix, of disposing plural dots to each matrix, excellent tone and resolution is obtained. Thereby, in a case where a color original includes both a picture and letters, images of both a picture and letters are excellently reproduced to form an excellent halftone color image which is closer to the color original.

Obviously, many modifications and variations of the present invention are possible in light of the above teachings. It is therefore to be understood that within the scope of the appended claims, the invention may be practiced other than as specifically described.

What is claimed is:

1. A tone processing method for controlling laser scanning by pulse width modulation during image forming with an image forming medium, said method comprising the steps of:
   performing tone processing to provide a halftone image, said step of performing tone processing including the steps of performing multi-value dither matrix control based upon a threshold matrix, and performing pulse width modulation; and
   when a halftone image includes both a picture and a letter, performing said step of multi-value dither matrix control based upon a 2×2 dot dispersion threshold matrix means which includes threshold values for providing a tone level output, said dot dispersion threshold matrix means having four image dots, said image dots being defined by a plurality of said threshold values wherein said plurality of threshold values of said four dots define a series of values and wherein said plurality of threshold values are assigned to said dots in a predetermined order such that none of said dots have consecutive values.

2. The tone processing method according to claim 1, wherein:
   a first of said four image dots has odd number values,
   a second of said four image dots has even number values,
   a third of said four image dots has odd number values, and
   a fourth of said four image dots has even number values.

3. The tone processing method according to claim 2, wherein a first row of said 2×2 dot dispersion matrix means is defined by said first image dot in a first column thereof and said third image dot in a second column thereof, and a second row of said dispersion matrix means is defined by said fourth image dot in the first column thereof and said second image dot in the second column thereof.

4. The tone processing method according to claim 3, wherein said series of values is consecutive from 1 to 256 and wherein
   said first of said four image dots has odd number values between 1 and 128, inclusive,
   said second of said four image dots has even number values between 1 and 128, inclusive,
   said third of said four image dots has odd number values between 129 and 255, inclusive, and
   said fourth of said four image dots has even number values between 130 and 256, inclusive.

5. A tone processing apparatus for controlling laser scanning by pulse width modulation during image forming with an image forming medium, said apparatus comprising:
   a memory means for storing a 2×2 dot dispersion threshold matrix means which includes threshold values for providing a tone level output, said dot dispersion threshold matrix means having four image dots, said image dots being defined by a plurality of values wherein said plurality of values of said four dots define a series of values and wherein said plurality of values are assigned to said dots in a predetermined order such that none of said dots have consecutive values; and
   means for performing tone processing to provide a halftone image by performing multi-value dither matrix control based upon a threshold matrix, and by performing pulse width modulation;
   said means for performing tone processing responding to a condition where a halftone image provided includes both a picture and a letter, by performing said multi-value dither matrix control based upon said 2×2 dot dispersion matrix stored in said memory means.

6. The tone processing apparatus according to claim 5, wherein, in said dot dispersion threshold matrix,
   a first of said four image dots has odd number values,
   a second of said four image dots has even number values,
   a third of said four image dots has odd number values, and
   a fourth of said four image dots has even number values.

7. The tone processing apparatus according to claim 6, wherein a first row of said 2×2 dot dispersion matrix means is defined by said first image dot in a first column thereof and said third image dot in a second column thereof, and a second row of said dispersion matrix means is defined by said fourth image dot in the first column thereof and said second image dot in the second column thereof.

8. The tone processing method according to claim 7, wherein said series of values is consecutive from 1 to 256 and wherein
   said first of said four image dots has odd number values between 1 and 128, inclusive,
   said second of said four image dots has even number values between 1 and 128, inclusive, said third of said four image dots has odd number values between 129 and 255, inclusive, and said fourth of said four image dots has even number values between 130 and 256, inclusive.

9. A tone processing apparatus as claimed in claim 5, wherein said means for performing tone processing includes a microcomputer and said memory means includes a ROM, and wherein said apparatus further comprises a color scanner for obtaining color image data, an analog to digital converter for converting analog input image data from said color scanner to digital color image data and supplying digital color image data to said microcomputer, and a laser scanner, connected to said microcomputer, for scanning an image forming medium to form a latent image thereon in response to receipt of a pulse width modulation signal from said microcomputer.

10. A tone processing method according to claim 1, wherein said four image dots of said 2×2 dot dispersion threshold matrix means are associated with two-time mainscanning of a laser beam.

11. A tone processing method according to claim 1, wherein said image forming medium is a photoreceptor drum.

12. A tone processing method according to claim 11, wherein said photoreceptor drum is provided in a digital electrophotographic copying machine.

* * * * *